June 2, 1942.  E. R. ZADEMACH  2,285,321
DELIVERY TABLE
Filed Feb. 17, 1939
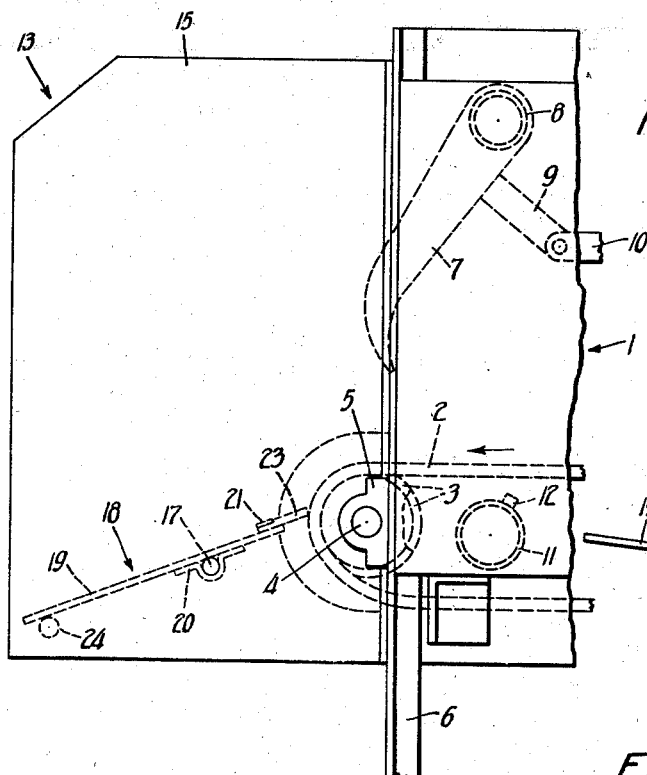
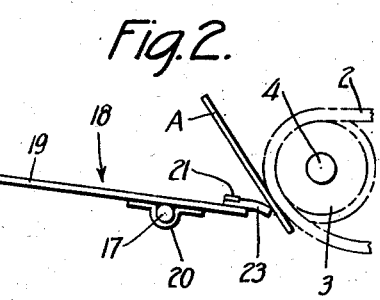
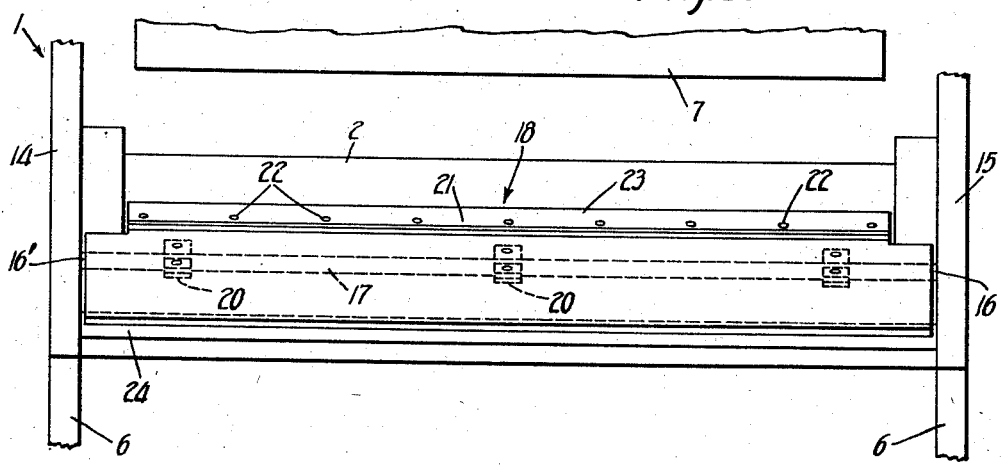
INVENTOR
Erich R. Zademach
BY Moses + Nolte
ATTORNEYS Patented June 2, 1942

2,285,321

UNITED STATES PATENT OFFICE 2,285,321

DELIVERY TABLE

Erich R. Zademach, Elizabeth, N. J., assignor to Metalwash Machinery Co., Inc., New York, N. Y., a corporation of New York Application February 17, 1939, Serial No. 256,843

4 Claims. (Cl. 198—65)

This invention relates to delivery tables for the reception of articles which have been supported during a processing operation, such as washing or drying, on a movable conveyor.

In such devices, as usually constructed, an article sometimes becomes jammed between the conveyor and the delivery platform or table, with the result that the conveying mechanism is disabled or broken, resulting in stoppage of the machine and holding up the work. It is accordingly an object of this invention to provide a delivery table which is movable by an article whenever the article is not properly deposited thereon but becomes caught between the end of the table and the conveyor.

A further object of the invention is to provide, in association with a movable conveyor, a delivery table which is pivotally mounted in such a manner that, upon an article becoming inserted or caught between the end of the table and the conveyor, the end will be moved downward in the same general direction as the conveyor and permit the article to pass freely between the end of the table and the conveyor.

A cognate object of the invention is to provide in association with a movable conveyor, a delivery table having a flexible end member which yields upon an article leaving the conveyor becoming caught between it and the end of the table. Other and further objects of the invention will become apparent to those skilled in the art as the description thereof proceeds. For a better understanding of the invention, however, reference is made to the accompanying drawing, in which:

Fig. 1 is a fragmentary front elevation of one end of a drying apparatus, including a delivery table embodying the invention;

Fig. 2 is a fragmentary front elevation showing the delivery table of Fig. 1 in another position, and Fig. 3 is a fragmentary end view of the drying apparatus of Fig. 1.

The drying apparatus illustrated is of the type described in application Serial No. 198,344, filed March 28, 1938, and a continuation application thereof, Serial No. 325,845, filed March 25, 1940, and includes a drying cabinet 1 through which the articles to be dried are carried in the direction indicated by the arrow by the belt or chain conveyor 2, one end of which passes over and is supported by the pulleys or sprockets 3 secured to a shaft 4 rotatably supported in bearing brackets 5, only one of which is shown. The cabinet 1 is supported at a suitable level above the floor by supporting legs 6.

Mounted near one end of the cabinet, a pivotally supported hollow nozzle 7 is shown, adapted to direct a supply of heated air onto the articles carried through the drier by conveyor 2. The nozzle 7 is pivotally mounted on a sleeve 8 and carries a depending arm 9, the arm 9 being connected to a link 10 whereby the level of the nozzle above conveyor 2 may be adjusted by operation of the link 10. Additional nozzles, similarly constructed and mounted, and similarly connected to the link 10 may be provided for simultaneous adjustment as fully described in the above noted applications. For the purpose of directing heated air against the bottoms of the articles, pipes 11, only one being shown, are disposed between the upper and lower stretches of the conveyor 2 and having outlet nozzles 12.

Secured to one end of cabinet 1 is a hood 13 comprising the opposite side walls 14, 15, within which is journalled the end portions 16, 16' of a shaft or rod 17. The delivery table 18 is secured for pivotal movement to shaft 17 and comprises a substantially flat metal plate 19 resting on the upper side of shaft 17 and secured thereto by a plurality of spaced apart brackets or clamps 20. Secured to the receiving end of plate 19, as by the flat bar or strip 21 and rivets 22, is a projecting flexible member 23 in the form of a wide strip of rubber or other suitable flexible material, the end of member 23 lying close to conveyor 2 in the normal position of table 18, as shown in Fig. 1. As a further means of supporting table 18 in its normal position, a cross rod 24 is provided which extends between the side walls 14, 15, the plate 19 resting on rod 24 as shown.

In operation, articles passing through the drier on conveyor 2, upon reaching the sprockets 3, normally fall freely onto table 18, slide down it and fall into a suitable receptacle placed to receive them, or they may pass onto another conveyor which transports them for further treatment. Should an article A, however, become caught or jammed between conveyor 2 and the flexible member 23, this member will bend and the table 18 rock about the axis of shaft 17 to the position illustrated in Fig. 2, permitting the article to be carried along between conveyor 2 and the end of table 18 and to finally pass from the table, leaving it free to return to its normal position. It is thus apparent that the invention provides a simple and effective means for preventing injury to the article and to the conveyor and its driving means, in event an article becomes inserted or caught between the conveyor 2 and the delivery table 18. While the invention has been illustrated in connection with the conveyor of a drying apparatus, it will be understood that it is not limited to such application but may be used in association with conveyors used in the transport of articles in other processing operations, such as washing, plating, etc.

I have described what I believe to be the best embodiment of my invention. I do not wish, however, to be confined to the embodiment shown, but what I desire to cover by Letters Patent is set forth in the appended claims.

I claim:

1. Conveying apparatus comprising a continuous belt conveyor having a downwardly curved discharge end, and a delivery table extending downwardly and outwardly from said conveyor end, the table having a flat upper surface with a margin immediately adjacent and below the top of the curved end of the conveyor in position to receive articles discharged therefrom, and being yieldably mounted for tilting said table downwardly and outwardly away from the conveyor under pressure of an article caught between said margin and the conveyor, for a distance sufficient to release such article, the table being normally free from tilting engagement with the conveyer.

2. Conveying apparatus as set forth in claim 1 in which the downwardly curved discharge end of the conveyor is curved about a horizontal axis and the table is tilted about an axis located at a lower level than said conveyor axis.

3. Conveying apparatus comprising a conveyor having a downwardly curved discharge end and a delivery table extending downwardly and outwardly from said conveyor end, the table having one margin immediately adjacent and below the top of the curved end of the conveyor in position to receive articles discharged therefrom, said table comprising a flat rigid article-receiving body yieldably mounted for article-releasing movement under pressure of an article caught between the table and the conveyor, said table body having a marginal portion normally located immediately adjacent the conveyor and yieldable relative to the contiguous part of the body under pressure of an article caught between said marginal portion and the conveyor.

4. Conveying apparatus comprising a conveyor having a downwardly curved discharge end and a delivery table extending downwardly and outwardly from said conveyor, the table having a margin normally located immediately adjacent and below the top of the curved end of the conveyor in position to receive articles discharged therefrom, and being yieldably mounted for tilting said table margin downwardly in a path intersecting the path of the conveyor for a distance sufficient to release articles caught between the table and the conveyor, the portion of the table intersecting the path of the conveyor during such downwardly movement being yieldable relative to the remainder of the table to permit such movement.

ERICH R. ZADEMACH.